Patented Nov. 22, 1932

1,888,391

UNITED STATES PATENT OFFICE

ALFRED NEWMAN, OF TOMPKINSVILLE, NEW YORK, ASSIGNOR TO PACIFIC COAST BORAX COMPANY, OF NEW YORK, N. Y., A CORPORATION OF NEVADA

PROCESS OF PREPARING BORIC ACID

No Drawing. Application filed April 16, 1928. Serial No. 270,579.

This invention relates to processes of preparing boric acid and more particularly for producing boric acid from borates such as borax.

Heretofore in the prior art boric acid has been prepared from borates by first preparing a solution of borate in hot water or mother liquor so that a high concentration of the borate in water or mother liquor could be obtained, and then adding a suitable acid to such solution in order to decompose the borate and set free boric acid, the boric acid remaining in solution. The hot solution of boric acid was then filtered and cooled to permit crystallization of the boric acid to take place.

Such prior art methods, however, are open to a number of objections, among which it may be noted that at a temperature up to 212° F. the solutions obtained have a concentration of from 12% to 20% boric acid. The amount of heat required in carrying out such processes was great, due to the fact that large volumes of solutions had to be heated. Furthermore, the hot solutions of acids of concentrations set forth above exhibit a strong acid reaction and were quite destructive to materials of which the apparatus was composed.

Among the objects of the present invention may be noted processes of preparing boric acid in which the use of hot acid solutions is avoided, so that losses due to corrosion and disintegration of apparatus are avoided.

Other and further objects and advantages will appear from the more detailed description set forth below, it being understood, however, that such more detailed description is given by way of illustration and not by way of limitation, since various changes may be made therein by those skilled in the art without departing from the spirit and scope of the present invention.

In carrying out the present invention, instead of using a solution of the borate desired, the borate is suspended preferably in water or in a mother liquor saturated with boric acid or in any suitable aqueous solution. When using such method, no heat need be added to the materials undergoing treatment, and the suspension may be at substantially atmospheric temperature condition. There may be a slight rise in temperature of the materials undergoing treatment due to the chemical reactions taking place and the liberation of a small amount of heat due to those chemical reactions, but the amount of heat thus generated does not militate against the present process.

If desired, however, the materials undergoing treatment may be cooled to absorb the heat generated by the chemical reaction.

As an example of a preferred method of carrying out the present invention, the following is given: Sodium tetraborate ($Na_2B_4O_7.10H_2O$) is suspended in water by gentle agitation. The water used may be taken from wells or a normal city water supply system, and as derived from such sources does not generally exceed a temperature of 70° F.

While a small quantity of the borax may dissolve in the water, such solution represents but a small portion of the borax, most of the latter being in suspension. To the suspension of borax or other borate, a suitable acid is then added such as sulphuric acid. In one instance, which may be taken as illustrative, 308 parts by weight of crystallized borax ($Na_2B_4O_7.10H_2O$) was suspended in 418 parts of cold water. Sulphuric acid was added to this suspension in the proportion of 1 molecule of sulphuric acid to one of borax. Free boric acid is formed in the solid state, the water present being insufficient to dissolve all of the boric acid formed according to the reaction: $Na_2B_4O_7.10H_2O + H_2SO_4 = 4H_3BO_3 + Na_2SO_4 + 5H_2O$. The temperature of the mixture rose slightly to about 100° F., the water became saturated with boric acid, the sodium sulphate formed passed into solution and was removed from the solid boric acid by passing the mixture through a centrifugal extractor, washing the acid retained in the centrifugal basket with water suitably cold.

The boric acid produced by this method was equal in quality to that produced by the processes heretofore employed by the prior art.

Taking the proportions of material set forth in the example given above as illustrative, it may be noted that 308 parts of crystallized borax ($Na_2B_4O_7.10H_2O$) will yield about 200 parts of boric acid. With 418 parts of water (cold) about 46 parts of borax would be dissolved at the temperature of 100° F. which the mixture reached during the reaction. Obviously, therefore, most of the borax was present in suspension and at no time was all of the borax present dissolved in the water. Furthermore, it is noted that 418 parts of water at 100° F. will dissolve only about 33 parts of boric acid. The boric acid formed was for the most part precipitated in the solid state and could therefore be readily separated from the solution remaining which contained the sodium sulphate.

While the method set forth above is the preferred one for producing boric acid in accordance with this invention, an alternative method consists in mixing sulphuric acid with borax in the solid state whereby boric acid and sodium sulphate are formed, no heat being supplied to the reacting substances, and then subsequently removing the sodium sulphate from the boric acid by any suitable method as by washing with water, preferably cold, or other material.

While borax has been used as illustrative in the present examples, other borates may be used, as for example, anhydrous or crystallized borax ($Na_2B_4O_7$), monoborates, biborates, triborates, tetraborates, pentaborates of sodium, potassium, lithium, calcium, magnesium, etc., or any combination of the borate radical ($B_2O_3$) with these or other elements. It is desirable, however, to use a borate the metal radical of which forms a water soluble salt with the acid used for decomposing the borate and setting free boric acid.

As stated above, any suitable acid may be used, such as sulphuric acid, hydrochloric acid, nitric acid, acetic acid, etc. Desirably, however, the acid should be one which yields a water soluble salt with the metal of the borate undergoing treatment.

It will thus be seen that the process of the present invention involves the liberation of boric acid in relatively cold solutions, in which it is but slightly soluble so that any solutions which are formed during the process, exert a much less corrosive action on the apparatus employed than do the more concentrated solutions formed in prior art processes in which higher temperatures were utilized. Furthermore, it will be noted that the present process avoids the addition of heat in any substantial quantities from external sources as by means of steam, hot water, hot air, hot gas, or by any other means whatever, so that very substantial economy results from the present process.

Having thus described my invention, what I claim as new and desire to secure by Letters Patent, is:—

1. In a process of making boric acid, the step of treating a suspension of a borate in water, in the cold, with an acid to decompose said borate and to form boric acid, the amount of water present being insufficient to dissolve all of the boric acid formed.

2. The process of making boric acid which comprises treating a suspension of a borate in water with an acid to form undissolved boric acid in a mother liquor saturated with boric acid and containing a dissolved salt of reaction, and separating the mother liquor from the undissolved boric acid.

3. The process of making boric acid which comprises treating an unheated suspension of a borate in water with an acid to precipitate boric acid in a mother liquor saturated with boric acid and containing a dissolved salt of the reaction, and separating the mother liquor from the precipitated boric acid.

4. The process of making boric acid which comprises treating a suspension of borax in water with sulphuric acid to precipitate boric acid in a mother liquor saturated with boric acid and containing dissolved sodium sulphate, and separating the mother liquor and dissolved sodium sulphate from the precipitated boric acid.

5. The process of making boric acid which comprises suspending a borate in water, treating said suspension with an acid to form a quantity of boric acid greater than the water solution can dissolve, and a soluble salt of said acid with the metal of the borate, while agitating the mixture to maintain the borate in suspension, and separating the solution from the undissolved boric acid.

6. The process of making boric acid which comprises suspending borax in water, treating said suspension in the cold with sulphuric acid to set free boric acid and to form sodium sulphate and a water solution saturated with boric acid, the sodium sulphate going into solution in the water present and the boric acid in substantial amount remaining in the solid state, and separating the solution saturated with boric acid and containing the sodium sulphate.

7. The process of making boric acid, which comprises adding sulphuric acid to borax suspended in a solution saturated with the boric acid radical, whereby the undissolved borax is converted into solid boric acid.

8. The process of producing solid boric acid which comprises adding sulphuric acid to solid borax suspended in water, the quantity of water present being insufficient to dissolve the borax used or the solid acid produced, but being sufficient to dissolve the sodium sulphate formed.

9. The process of making boric acid, which comprises adding sulphuric acid to borax suspended in a mother liquor saturated with the boric acid radical, whereby the undissolved borax is converted into solid boric acid.

10. The process of producing solid boric acid which comprises reacting sulphuric acid with solid borax in an aqueous medium, the quantity of the aqueous medium being insufficient to dissolve all of the boric acid produced by the reaction, but being sufficient to dissolve the sodium sulphate formed by the reaction.

In testimony whereof I hereunto affix my signature.

ALFRED NEWMAN.